United States Patent
Panchalingam et al.

(10) Patent No.: US 11,184,325 B2
(45) Date of Patent: Nov. 23, 2021

(54) APPLICATION-CENTRIC ENFORCEMENT FOR MULTI-TENANT WORKLOADS WITH MULTI SITE DATA CENTER FABRICS

(71) Applicant: Cisco Technology, Inc., San Jose, CA (US)

(72) Inventors: Murukanandam K. Panchalingam, Dublin, CA (US); Umamaheswararao Karyampudi, Fremont, CA (US); Muralidhar Annabatula, Dublin, CA (US); Darpan R. Kathoke, Milpitas, CA (US); Junyun Li, San Jose, CA (US)

(73) Assignee: Cisco Technology, Inc., San Jose, CA (US)

( * ) Notice: Subject to any disclaimer, the term of this patent is extended or adjusted under 35 U.S.C. 154(b) by 239 days.

(21) Appl. No.: 16/431,615

(22) Filed: Jun. 4, 2019

(65) Prior Publication Data

US 2020/0389432 A1  Dec. 10, 2020

(51) Int. Cl.
*H04L 29/06* (2006.01)
*H04L 29/08* (2006.01)

(52) U.S. Cl.
CPC .......... *H04L 63/0236* (2013.01); *H04L 63/20* (2013.01); *H04L 67/10* (2013.01)

(58) Field of Classification Search
CPC ..... H04L 67/10; H04L 69/22; H04L 63/0236; H04L 63/20; H04L 12/4641; H04L 63/0227

See application file for complete search history.

(56) References Cited

U.S. PATENT DOCUMENTS

| | | | |
|---|---|---|---|
| 9,455,960 | B2 | 9/2016 | Budhani et al. |
| 9,787,639 | B1 * | 10/2017 | Sun .......................... H04L 63/20 |
| 2004/0193677 | A1 | 9/2004 | Dar et al. |

(Continued)

FOREIGN PATENT DOCUMENTS

EP    1634428 B1    1/2008

OTHER PUBLICATIONS

PCT Notification of Transmittal of the Intematinoal Search Report and the Written Opinion of the International Searching Authority, or the Declaration for Application No. PCT/US2020/035638 dated Sep. 16, 2020.

(Continued)

*Primary Examiner* — El Hadji M Sall
(74) *Attorney, Agent, or Firm* — Patterson + Sheridan, LLP (57) ABSTRACT

The present disclosure provides for application-centric enforcement for multi-tenant workloads with multi-site data center fabrics by: receiving, at a local switch at a first site, a packet from a first host at the first site intended for a second host located at a second site; identifying class identifiers (ID) for the hosts; determining, based on the class IDs, a security policy for transmitting data between the hosts; in response to determining that the security policy indicates that the second site exclusively manages security policies for the hosts' network: setting a policy applied indicator on the packet indicating that enforcement of the security policy is delegated from the first switch to a second switch connected to the second host; including the class IDs in the packet; and transmitting the packet to the second site.

20 Claims, 6 Drawing Sheets

(56) References Cited

U.S. PATENT DOCUMENTS

| | | |
|---|---|---|
| 2006/0013209 A1 | 1/2006 | Somasundaram |
| 2008/0046960 A1* | 2/2008 | Bade .................. G06F 9/4856 726/1 |
| 2010/0027549 A1 | 2/2010 | Satterlee et al. |
| 2010/0150072 A1 | 6/2010 | Ishii et al. |
| 2010/0329265 A1 | 12/2010 | Lapuh et al. |
| 2011/0072486 A1* | 3/2011 | Hadar ................ G06F 9/45558 726/1 |
| 2011/0072487 A1* | 3/2011 | Hadar .................. G06F 9/5072 726/1 |
| 2011/0137966 A1 | 6/2011 | Srinivasan et al. |
| 2012/0263035 A1 | 10/2012 | Nakanishi et al. |
| 2014/0064091 A1 | 3/2014 | Basso et al. |
| 2014/0096183 A1 | 4/2014 | Jain et al. |
| 2015/0124809 A1 | 5/2015 | Edsall et al. |
| 2017/0034057 A1 | 2/2017 | Kapadia et al. |
| 2017/0324660 A1 | 11/2017 | Sinha et al. |
| 2018/0063003 A1 | 3/2018 | Mekkattuparamban et al. |

OTHER PUBLICATIONS

PCT Notificiation of Transmittal of the International Search Report and the Written Opinion of the International Searching Authority, or the Declaration for Application No. PCT/US2019/040410 dated Sep. 24, 2019.

"Cisco ACI Multi-Site Architecture White Paper," May 28, 2019, 53 pages, www.cisco.com/c/en/us/solutions/collateral/data-center-virtualization/application-centric-infrastructure/white-paper-c11-739609.html.

R. Sharma et al., "Multi-Site EVPN based VXLAN using Border Gateways," Jun. 25, 2018, https://tools.ietf.org/html/draft-sharma-bess-multi-site-evpn-00.

U.S. Appl. No. 16/164,607, "Multisite Interconnect and Policy With Switching Fabrics," filed Oct. 18, 2018.

* cited by examiner

APPLICATION-CENTRIC ENFORCEMENT FOR MULTI-TENANT WORKLOADS WITH MULTI SITE DATA CENTER FABRICS

TECHNICAL FIELD

Embodiments presented in this disclosure generally relate to network fabrics with sites located at different geographic locations from one another that serve multiple tenants. More specifically, embodiments disclosed herein relate to implementing security policies for a given tenant at multiple sites across a network fabric.

BACKGROUND

Many data center tenants spread workloads across sites that are at different geographic locations from one another. Workloads may include service/application provider workloads and client workloads that access the service/application provider workloads. In a given site of a data center, one or more routers or switches receive incoming communications from outside of the site and forward those communications to one or more hosts connected to the routers or switches based on various security policies. Similarly, the routers receive outgoing communications from the hosts and send those communications to devices outside of the site based on various security policies. Examples of security policies may include rules for whether a given host (or workload on a given host) is permitted to communicate with another device, and how non-permitted communications are to be handled. Non-permitted communications may be dropped or ignored, quarantined, or flagged for administrative attention, whereas permitted communications are forwarded to the intended recipients (internal or external of the site). Tenants may assign various security policies for the various workloads running on the hosts, but the complexity of maintaining identical security policies across several sites increases as the number of sites increases.

BRIEF DESCRIPTION OF THE DRAWINGS

So that the manner in which the above-recited features of the present disclosure can be understood in detail, a more particular description of the disclosure, briefly summarized above, may be had by reference to embodiments, some of which are illustrated in the appended drawings. It is to be noted, however, that the appended drawings illustrate typical embodiments and are therefore not to be considered limiting; other equally effective embodiments are contemplated.

To facilitate understanding, identical reference numerals have been used, where possible, to designate identical elements that are common to the figures. It is contemplated that elements disclosed in one embodiment may be beneficially used in other embodiments without specific recitation.

DESCRIPTION OF EXAMPLE EMBODIMENTS

Overview

One embodiment presented in this disclosure provides a method for application-centric enforcement for multi-tenant workloads with multi-site data center fabrics, the method including: receiving, at a local switch at a first site, a packet from a first host at the first site intended for a second host located at a second site at a different geographical location from the first site; identifying a second class identifier (ID) for the second host from a database maintained at the first site, wherein a first class ID for the first host is known to the local switch; determining, based on the first class ID and the second class ID, a security policy for transmitting data from the first host to the second host; in response to determining that the security policy indicates that the second site exclusively manages security policies for a software defined network including the first host and the second host: setting a policy applied indicator, derived from a policy override indicator, on the packet indicating that enforcement of the security policy is delegated from the first switch to a second switch connected to the second host at the second site; including the first class ID and the second class ID in the packet; and transmitting the packet to the second site.

One embodiment presented in this disclosure provides a method for application-centric enforcement for multi-tenant workloads with multi-site data center fabrics, the method including: receiving, at a local switch of a first site, a packet from a remote host located at a second site, wherein the packet is intended for a local host located at the first site, wherein the packet includes a policy applied indicator; and in response to determining that the policy applied indicator indicates that a security policy for communication between the remote host and the local host is delegated to the local switch, applying the security policy to the packet at the local switch, wherein applying the security policy to the packet results in the local switch sending the packet to the local host.

One embodiment presented in this disclosure provides a network fabric with application-centric enforcement for multi-tenant workloads, the network fabric including: a first site, including: a first host; and a first switch in communication with the first host; a second site, located at a different geographic location than the first site, and in communication with the first site via an inter-site network, including: a second host; and a second switch in communication with the second host wherein security policies for the network fabric are localized to the first site; wherein the second switch is configured to: in response to receiving a first packet from the second host addressed to the first host and determining that the security policies for the network fabric are localized to the first site, include a first class identifier (ID) of the first host, a second class ID of the second host, and a policy applied indicator in the first packet; and transmit the first packet to the first site; and wherein the first switch is configured to: in response to receiving the first packet, determine based on the policy applied indicator that the second switch delegates enforcement of the security policies to the first switch; and apply a security policy to the first packet based on the first class ID and the second class ID.

Example Embodiments

In a multi-tenant network environment spread across multiple locations, deploying security policies to the multiple sites can be time and resource intensive, and may result in service downtime or uneven distribution when deploying new security policies to different sites. By centralizing the application of security policies to a network switch connected to the host providing a service, rather than distributing the security policy to every network switch connected to a host providing the service or a client of that service, a network operator may preserve hardware and computing resources, remove operational hurdles related to co-housing multiple applications with different security policies within a shared subnet, and more consistently and more quickly deploy security policies to affect a tenant's workloads.

Figure 1:
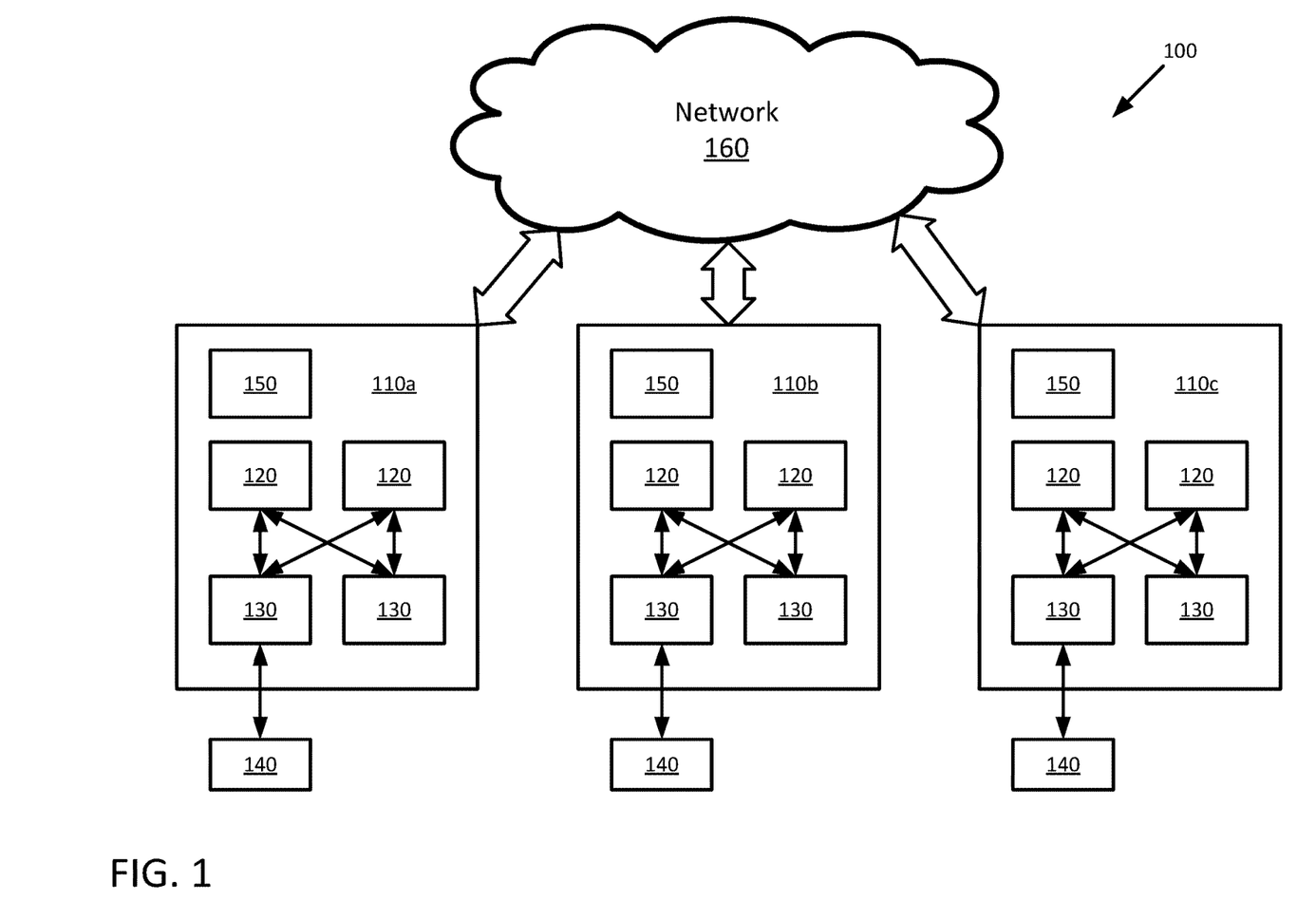
FIG. 1 illustrates a network fabric, according to embodiments of the present disclosure.

FIG. 1 illustrates a network fabric 100, according to embodiments of the present disclosure. The illustrated network fabric 100 is a Software Defined Network (SDN) that includes a first site 110a (generally, site 110), a second site 110b, and a third site 110c, where each of the sites 110 are located at different geographic locations from one another (i.e., are remotely located). Although three sites 110a-c are discussed in the examples herein, a network fabric 100 may include more than or fewer than three sites 110 in other examples. Each of the sites 110 is connected to the other sites 110 in the network fabric 100 via a network 160, such as the Internet or another public network, to operate as a single network despite the distances between remotely located elements.

In FIG. 1, each site 110 includes various spine switches 120 and leaf switches 130 that may be divided into various clusters based on communication paths, tenants of the site 110, etc. The spine switches 120 and the leaf switches 130 are specialized computer networking devices for routing data within a network. Example hardware that may be used in a spine switch 120 or leaf switch 130 is discussed in relation to FIG. 6. In various embodiments, the spine switches 120 and leaf switches 130 may retain addressing information for devices connected thereto or that have previously been in communication with the switch in an internal cache, or in an external cache (such as the endpoint databases 510 discussed in relation to FIG. 5).

As illustrated, the leaf switches 130 route communication flows through the spine switches 120, and the spine switches 120 route communication flows through the leaf switches 130. Stated differently, within a site 110, the spine switches 120 are not in direct communication with other spines switches 120 and the leaf switches 130 are not in direct communication with other leaf switches 130. In the illustrated network fabric 100, the spine switches 120 in remote sites 110 are communicated together to link the sites 110 over the public network 160 into the network fabric 100. The spine switches 120 in each site 110 may each have one or more interfaces dedicated to handling communications from the host devices 140 that are sent externally from the local site 110 to one or more spine switches 120 at remote sites 110 in the network fabric 100 over the public network 160. Additionally, each site 110 includes a respective local-site controller 150 to control the associated sites 110. The local-site controllers 150 can be implemented using software, hardware, or combinations thereof. Although each of the spine switches 120 are illustrated as being connected to each of the leaf switches 130 in a given site 110 in FIG. 1, other arrangements are contemplated.

Various host devices 140 are connected to the leaf switches 130, and host the workloads for various tenants. A tenant may define various class identifiers (also referred to as class IDs) and assign those class IDs to the various devices and services provided by the host devices 140. The host devices may provide services or clients for various tenants of the network fabric 100, and although one host device 140 is illustrated in FIG. 1 for each site 110, it will be appreciated that the network fabric 100 may include a plurality of host devices 140, wherein each individual host device 140 is connected to an individual leaf switch 130. Each leaf switch 130 may be connected to one or a plurality of host devices 140, which may be allocated to one or a plurality of different tenants.

Because several different tenants may share computing resources provided in a given site 110, and tenants may wish to manage communications between the workloads associated with a particular tenant, the tenants may specify various security policies for how communications are to be handled. A security policy may, for example: allow a first workload to communicate with a second workload, may block communications from a first workload from being received by a second workload, may limit a first workload to receive communications only from known sources (e.g., a whitelist), may block a first workload from receiving communication from known sources (e.g., a blacklist), etc. When a security policy blocks a communication or otherwise prevents a communication from being received by a given workload, the communication may be dropped, ignored, quarantined (e.g., held or forwarded to a different device for analysis), or forwarded to a different device or workload than the originally specified destination. When security policies are implemented at the leaf switches 130, the determination to allow an incoming packet to reach an intended workload results in leaf switches 130 delivering the packet to an indicated host device 140, blocking the packet from being received by an indicated host device 140, or forwarding the packet to a different host device 140 or node (e.g., a quarantine device).

As the number of host devices 140 that are connected to the network fabric 100 increases, and the number of sites 110 included in the network fabric 100 increases, security policies that specify whether to permit communication between a sending host device 140 and receiving host device 140, the even and consistent deployment of these security policies becomes more difficult. Stated differently, security policies face a scalability challenge as the size and complexity of the network fabric 100 grows. However, by centralizing the implementation of security policies to a single leaf switch 130 in the network fabric 100 (e.g., that serves the host device 140 providing a service/application provider workload), the other leaf switches 130 (e.g., those serving host devices 140 providing client workloads) can delegate enforcement of security policies to one leaf switch 130, and thereby overcome the scalability challenge. A first leaf switch 130 that enforces the security policies maintains the security policies set by the tenant (or particular service designated by the tenant), while the other leaf switches 130 indicate in messages transmitted to host device 140 that the enforcement of the security policies has been deferred or delegated to the first leaf switch 130.

Figure 2:
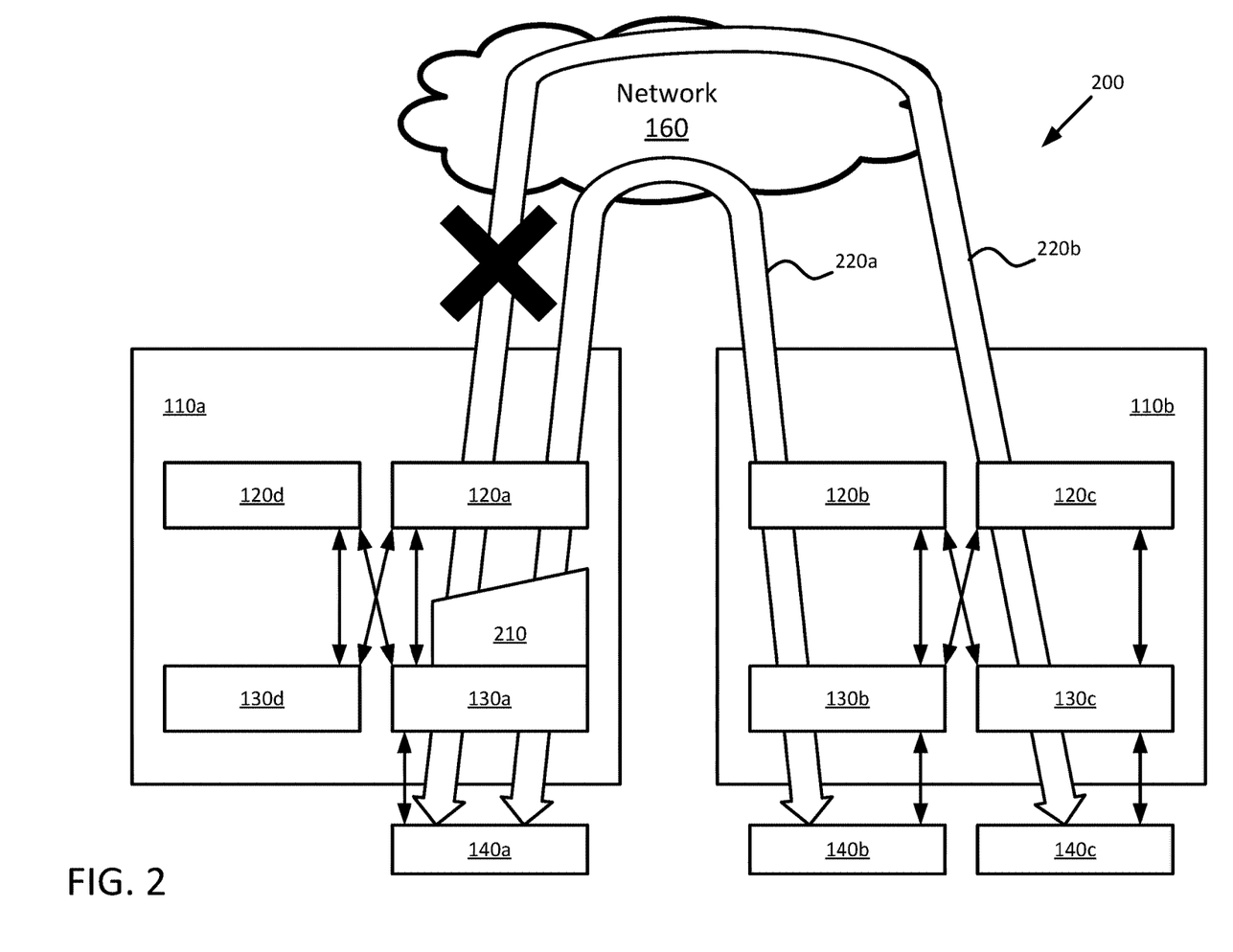
FIG. 2 illustrates communication pathways, according to embodiments of the present disclosure.

FIG. 2 illustrates a communications scenario 200 in which security policy enforcement has been localized to a first site 110a for communications between the first site 110a and a second site 110b. The first site 110a includes at least a first leaf switch 130a that maintains and applies security policies 210, a fourth leaf switch 130d, a first spine switch 120a, and a fourth spine switch 120d. The second site 110b includes at least a second leaf switch 130b, a third leaf switch 130c, a second spine switch 120b, and a third spine switch 120c. In the illustrated communication scenarios, a first host device 140a providing a service for a tenant is connected to the first leaf switch 130a, a second host device 140b that provides a client workload for the tenant to access the service provider workload (provided by the first host device 140*a*) is connected to the second leaf switch 130*b*, and a third host device 140*c* (which may be associated with the tenant of the other host device 140*b* or a different tenant) is connected to the third leaf switch 130*c*.

As illustrated in FIG. 2, the security policies 210 allow (or permit) communications between the first host device 140*a* and the second host device 140*b*, and deny (i.e., do not allow or permit) communications between the first host device 140*a* and the third host device 140*c*.

Although the communications scenario 200 discussed in relation to FIG. 2 indicates that the communications are routed through particular spine switches 120, it will be appreciated that the communications may also be routed through other spine switches 120 (e.g., through the fourth spine switch 120*d* rather than the first spine switch 120*a* and vice versa, through the third spine switch 120*c* rather than the second spine switch 120*b* and vice versa, or through another spine switch 120 that is not illustrated). Stated differently, any of the spine switches 120 in a given site 110 that are in communication with the associated leaf switch 130 for an indicated host device 140 may be used to route the communications to/from the network 160 from/to the indicated host device 140.

In FIG. 2, a first communication pathway 220*a* (generally, communication pathway 220) between the first host device 140*a* and the second host device 140*b* is illustrated that passes through the first leaf switch 130*a*, the first spine switch 120*a*, the network 160, the second spine switch 120*b*, and the second leaf switch 130*b*. The first communication pathway 220*a* may carry packets sent from the first host device 140*a* to the second host device 140*b* and/or packets sent from the second host device 140*b* to the first host device 140*a*. A second communication pathway 220*b* between the first host device 140*a* and the third host device 140*c* passes through the first leaf switch 130*a*, the first spine switch 120*a*, the network 160, the third spine switch 120*c*, and the third leaf switch 130*c*. The second communication pathway 220*b* may carry packets sent from the first host device 140*a* to the third host device 140*c* and/or packets sent from the third host device 140*c* to the first host device 140*a*.

Because the packets carried on the communication pathways 220 pass through the first leaf switch 130*a*, regardless of whether addressed from or addressed to the first host device 140*a*, the first leaf switch 130*a* can apply the security policies 210 to all communication carried on the communication pathways 220, thus relieving the second leaf switch 130*b* or the third leaf switch 130*c* from needing to maintain and apply a set of security policies 210 for the communication pathways 220.

For packets originating at the second host device 140*b* or the third host device 140*c* and destined for the first host device 140*a*, the associated second leaf switch 130*b* in the second site 110*b* indicates that enforcement of the security policies 210 has been overridden, and are thus delegated to the first leaf switch 130*a* to apply. By overriding enforcement of the security policies 210 at the second site 110*b*, the forwarding plane between the sites 110 allows communications originating at the second site 110*b* to reach the first site 110*a*, even when the securities policies 210 (or a lack of relevant security policies 210) would otherwise block or drop the traffic. Accordingly, a packet from the second host device 140*b* transmitted to the first host device 140*a* on the first communication pathway 220*a* and a packet from the third host device 140*c* on the second communication pathway 220*b* both arrive at the first leaf switch 130*a*. The first leaf switch 130*a*, however, applies the security policies 210 and determines whether to forward the packet to the first host device 140*a* (e.g., as from the second host device 140*b*) or to block the first host device 140*a* from receiving the packet (e.g., as from the third host device 140*c*).

For packets originating at the first host device 140*a* and destined for the second host device 140*b* or the third host device 140*c*, the first leaf switch 130*a* applies the security policies 210 to the outbound packets. The first leaf switch 130*a* blocks, drops, quarantines, or redirects any packet that the security policies 210 do not permit to pass from the first host device 140*a* to the second host device 140*b*. Accordingly, a packet from the first host device 140*a* addressed to the second host device 140*b* that is received by the first leaf switch 130*a* is permitted to continue on the first communication pathway 220*a* and a packet from the first host device 140*a* addressed to the third host device 140*c* is blocked at the first leaf switch 130*a* from continuing on the second communication pathway 220*b*.

In some embodiments, the second host device 140*b* and the third host device 140*c* may be housed in the same subnet (e.g., both in 20.20.0.0/16), but belong to different endpoint groups, and are thus subject to different security policies 210. Accordingly, although the forwarding plane of the network will route traffic from the first host device 140*a* to the second host device 140*b* and the third host device 140*c*, the security policies 210 should block or deny communications on the second pathway communication 220*b*, but permit or allow communication on the first communication pathway 220*a*.

Figure 3:
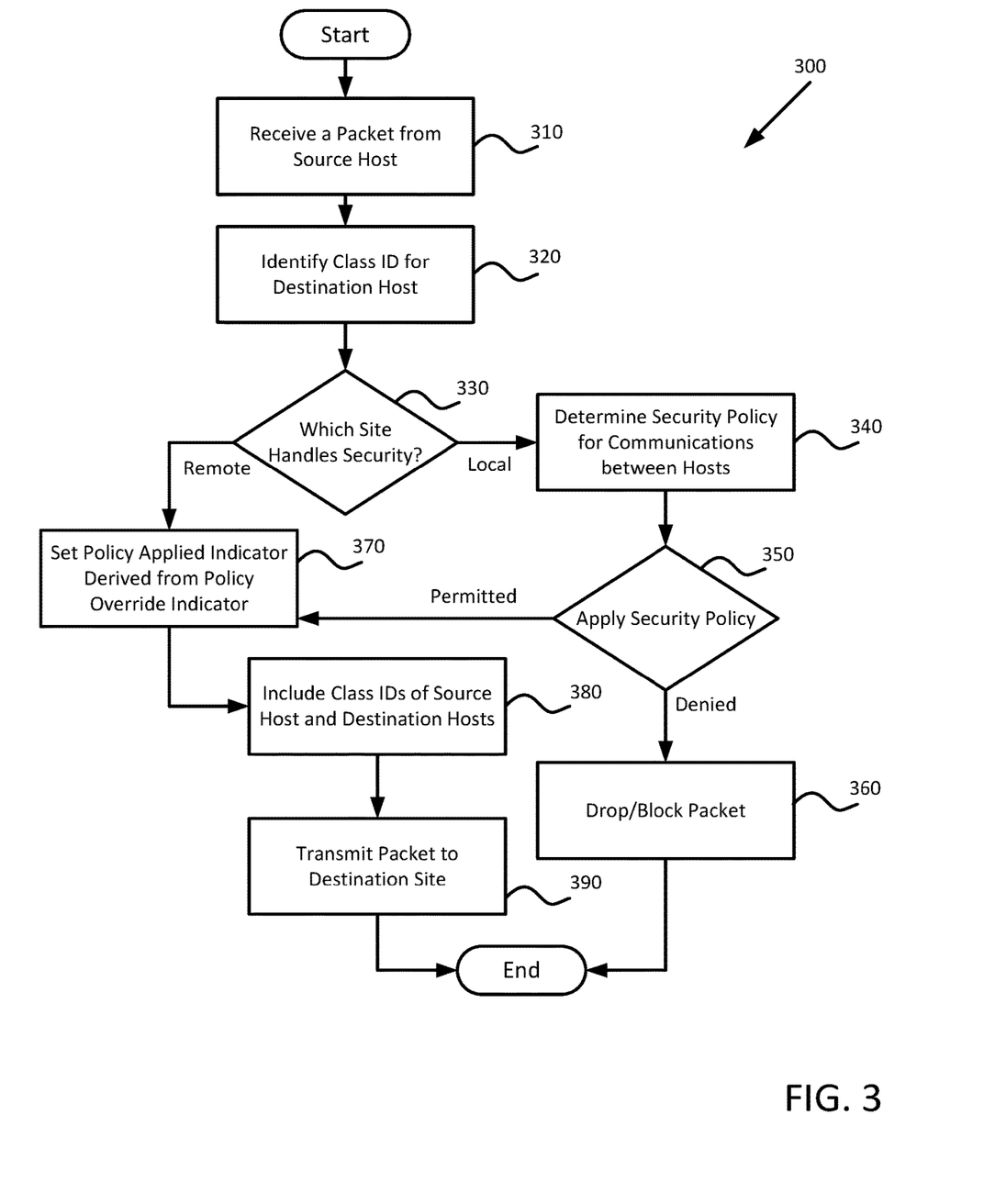
FIG. 3 is a flowchart of a method for processing outbound packets from an ingress site at a network switch, according to embodiments of the present disclosure.

FIG. 3 is a flowchart of a method 300 for processing outbound packets at a leaf switch, according to embodiments of the present disclosure. At block 310 a local switch (e.g., local to a first site) receives a packet from a first host intended for a second host located at a remote site at a different geographical location. For example, with reference to FIG. 2, the first leaf switch 130*a* in the first site 110*a* may receive a packet destined for the second host device 140*b* from the first host device 140*a*.

In various embodiments, the local switch does not know, or is not provided with, a physical address for the second host; the IP (Internet Protocol) address, MAC (Media Access Control) address, VLAN (Virtual Local Area Network) address, and/or VXLAN (Virtual Extensible Local Area Network) address may be unknown to the local switch. Instead, at block 320, the local switch identifies (e.g., looks up) the class ID for the destination host. The class IDs for remote hosts are stored in a database (maintained on the spine switches of the site) that learn and store the class IDs for remote hosts either conversationally or via a slow-path endpoint learning mechanism, as discussed in greater detail in regard to FIG. 5. Because the local switch is connected to the first host, the local switch does not need to look up the class ID for the first host; the class ID for the first host is already known to the local switch. The class IDs for the hosts identify tenant=defined types of devices or services provided by the various hosts (e.g., service provider of type A, client of type A, client of type 8).

At block 330, the local switch determines which site handles security policies—the local site or the remote site. The local switch uses the class IDs for the first host and the second host to determine whether a security policy for the identified class IDs is maintained on the local switch. In response to not identifying a security policy for transmitting data between the first host and the second host, the local switch determines that security policies are enforced remotely (i.e., at the remote site), and method 300 proceeds to block 340. In response to identifying a security policy for transmitting data between the first host and the second host, the local switch determines that security policies are enforced locally, and method 300 proceeds to block 340.

At block 340, the local switch determines what the security policy specifies for how communications between the first host and the second host are to be handled. Method 300 proceeds to block 350, where the local switch applies the security policy. Depending on what action the security policy specifies, method 300 proceeds to block 360 when the communication is denied or proceeds to block 370 when the communication is permitted.

At block 360, when the security policy denies the communication between the first host and the second host, the local switch drops or blocks the packet. In various embodiments, a dropped/blocked packet may be deleted from the memory of the local switch, quarantined, forwarded to another device, etc. In some embodiments, the local switch indicates to the first host when a security policy denies the packet from being transmitted to the second host. Method 300 may then conclude.

At block 370, the local switch sets a policy applied indicator in the packet, derived from a policy override indicator of where security policies are to be applied to the packet, which identifies to a remote switch (connected to the second host) on receipt of the packet whether the security policies for communications between the first host and the second host were applied by the local switch, or have been delegated to the remote switch to perform. When the policy override indicator is TRUE, the policy applied indicator is set to FALSE; indicating that the security policy has not been applied by the local switch and should be applied by the remote switch. When the policy override indicator is FALSE, the local switch has applied the appropriate security policy for the indicated endpoints (per blocks 340 and 350), and the local switch sets the policy applied indicator to TRUE (for the packets not dropped per block 350). As will be appreciated, in various embodiments, TRUE and FALSE may be specified based on the individual binary values of a designated bit (e.g., interpret $bit_n=0_{binary}$ as FALSE, $bit_n=1_{binary}$ as TRUE), or may be encoded in the values of multiple bits for added security, tamper resistance, or error-proofing (e.g., based on a consensus value of x bits).

At block 380, when the security policy permits the communication between the first host and the second host (per block 360) or the local switch has delegated application to the remote switch and set an override indicator (per block 340), the local switch includes the class ID of the destination host and the class ID of the source host (e.g., a first class ID and a second class ID associated with the respective first host and second host) in the packet. Method 300 proceeds to block 390 from block 380, where the local switch transmits the packet to the remoted destination site. In various embodiments, the local switch forwards the packet to a spine switch in the local site, which forwards the packet over a public network to the remote site. Method 300 may then conclude.

Figure 4:
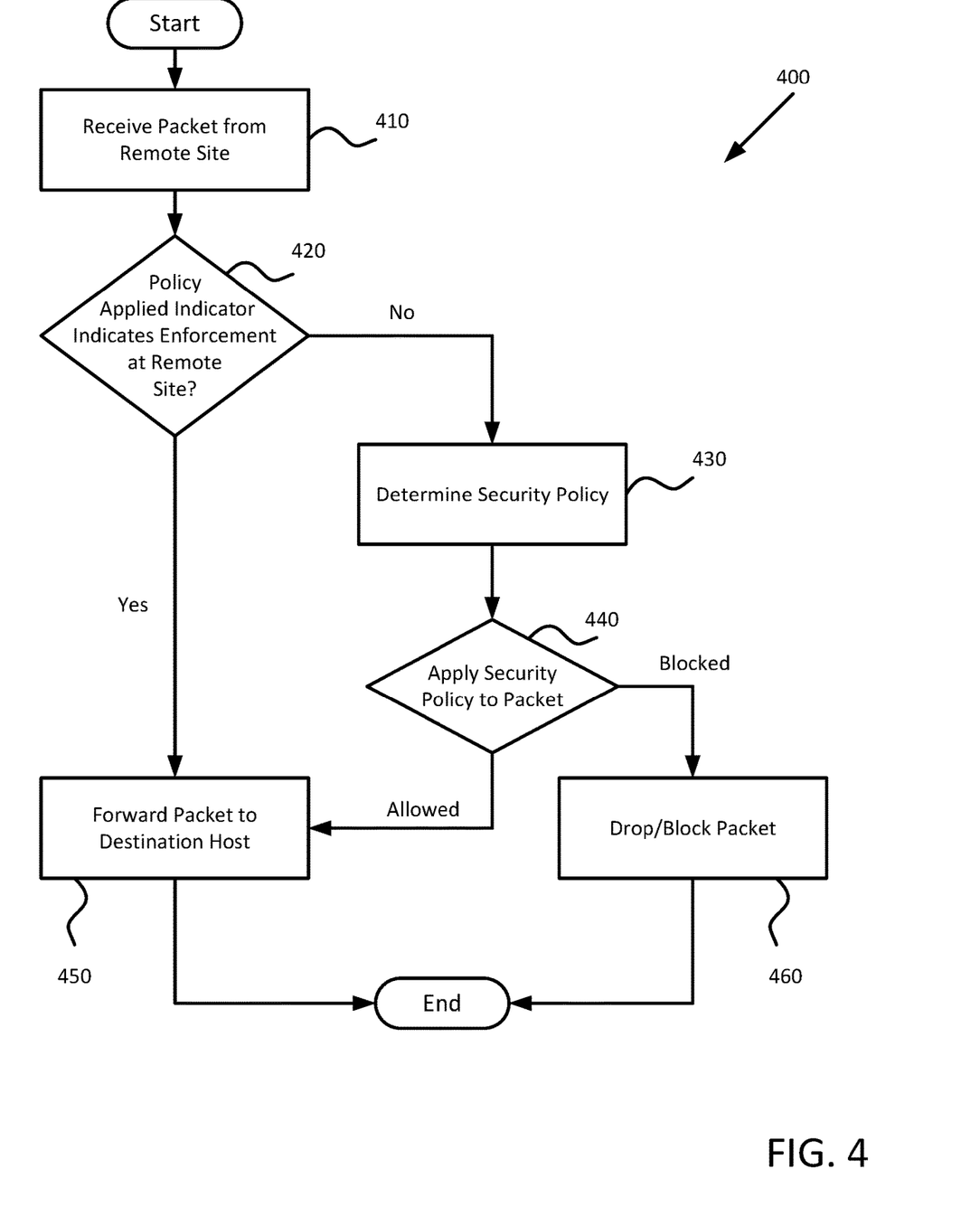
FIG. 4 is a flowchart of a method for processing inbound packets at a network switch, according to embodiments of the present disclosure.

FIG. 4 is a flowchart of a method 400 for processing inbound packets at a leaf switch, according to embodiments of the present disclosure. Method 400 begins at block 410 when a local switch receives a packet from a remote site (e.g., a packet transmitted per block 390 of method 300, described in relation to FIG. 3).

At block 420, the local switch determines whether the packet received in block 410 includes a policy applied indicator set to indicate that the remote (sending) switch has handled enforcement of the security policies. When the policy applied indicator is set to indicate that the security policy was not handled by the remote switch (e.g., security is delegated to the local switch or every switch is to apply security policies), method 400 proceeds to block 430. When the policy applied indicator is set to indicate that the security policy has been handled by the remote switch, method 400 proceeds to block 450.

At block 430, the local switch determines, based on the Class IDs of the local (receiving) host and the remote (sending) host the security policy to apply to the packet. At block 440, the local switch applies the security policy to the packet. When the security policy indicates that the packet is allowed or the remote host and the local host are otherwise permitted to communicate, method 400 proceeds to block 450. When the security policy indicates that the packet is blocked or the remote host and the local host are otherwise not permitted to communicate, method 400 proceeds to block 460.

At block 450, the local switch forwards the packet to the destination host. When method 400 reaches block 450, either the remote switch applied the security policies to (as indicated by the policy applied indicator per block 420) or the local switch applied the security policies to (per block 440). Method 400 may then conclude.

At block 460, the local switch drops or blocks the packet from being delivered to the local (destination) host. In various embodiments, a dropped/blocked packet may be deleted from the memory of the local switch, quarantined, forwarded to another device, etc. In some embodiments, the local switch indicates to the remote (sending) host when a security policy denies the packet from being delivered to the local (receiving) host. Method 400 may then conclude.

Figure 5:
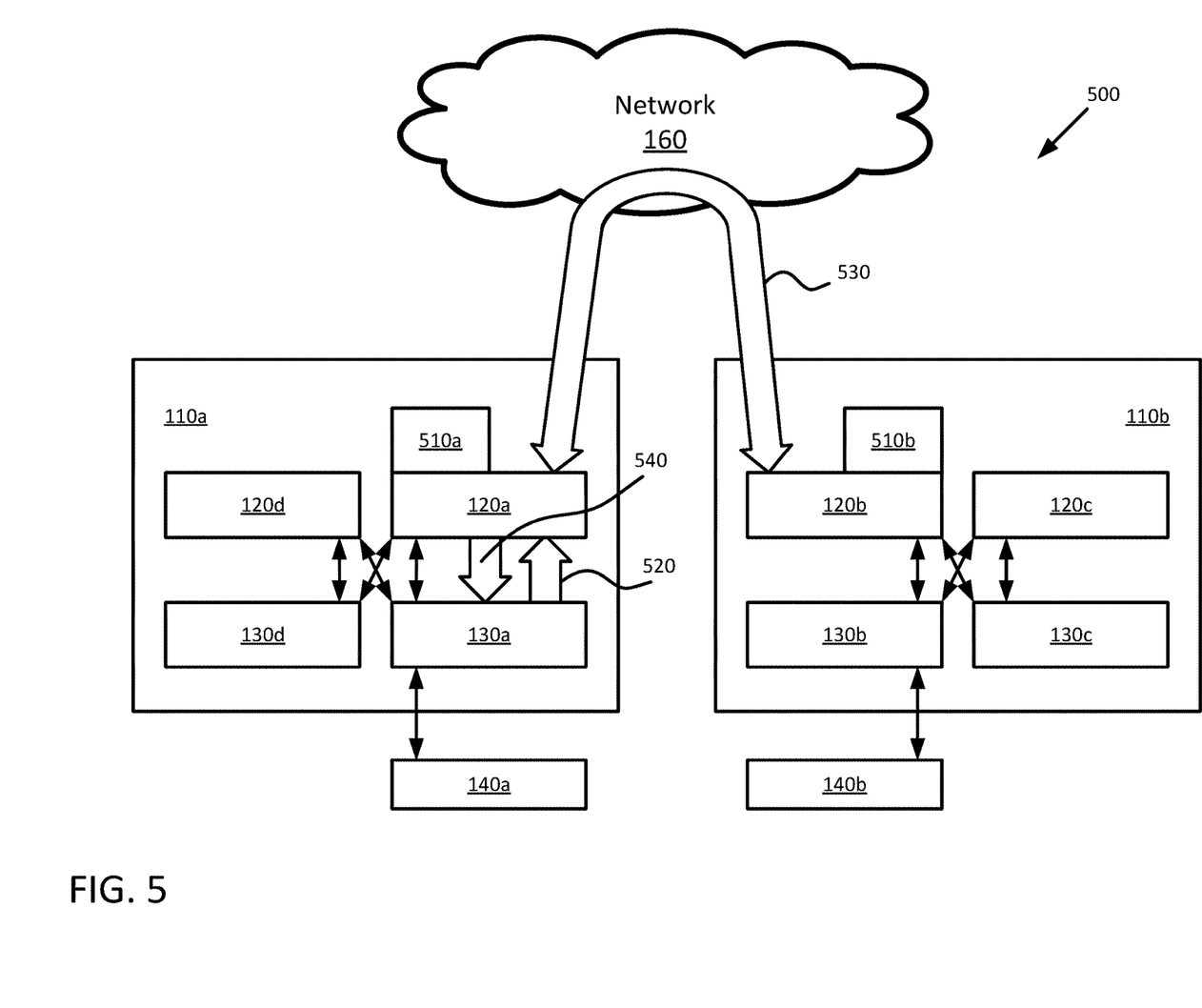
FIG. 5 illustrates a learning scenario for the class identifiers for remote hosts, according to embodiments of the present disclosure.

FIG. 5 illustrates a learning scenario 500 for the class IDs for remote hosts (i.e., host devices 140 and the processes run thereon from other sites 110). The first site 110a includes at least a first leaf switch 130a, a fourth leaf switch 130d, a first spine switch 120a maintaining a first endpoint database 510a (generally endpoint database 510), and a fourth spine switch 120d. The second site 110b includes at least a second leaf switch 130b, a third leaf switch 130c, a second spine switch 120b maintaining a second endpoint database 510b, and a third spine switch 120c. The first site 110a and the second site 110b are in communication with one another over a network 160.

When communications are sent between the two sites 110, the class IDs for the sending hosts are included in the communications, and a spine switch 120 receiving a communication may store the class ID for a remote host in the associated endpoint database 510 for use by any leaf switch 130 at that site 110. For example, a communication received by the first spine switch 120a from the second host device 140b includes the class ID for the second host device 140b, which the first spine switch 120a stores in the first endpoint database 510a. In another example, a communication received by the second spine switch 120b from the first host device 140a includes the class ID for the first host device 140a, which the second spine switch 120b stores in the second endpoint database 510b. Learning and storing the class IDs of remote hosts from the communications sent between two sites 110 is referred to herein as "conversational learning" and variants thereof. However, if traffic between the hosts located at different sites 110 is not observed for a predefined amount of time, the endpoint database 510 may "age out" and remove a class ID for a host that has not sent a communication within the predefined amount of time.

To update or supplement the endpoint database 510 when class IDs for remote hosts are not present in the endpoint database 510, each spine switch 120 may query the endpoint database 510 of the other site to provide a class ID for a requested host. For example, for a communication flow from the first host device 140a to the second host device 140b, if the first leaf switch 130a does not know the class ID for the second host device 140b, the first leaf switch 130a sends an ID request 520 to the first endpoint database 510 to return that class ID.

If the first endpoint database 510a does not include the class ID for the second host device 140b, the first spine switch 120a sends a gleaning request 530 to a spine switch 120 at the second site 110b (e.g., second spine switch 120b), which replies with the requested class IDs (e.g., as stored in a second endpoint database 510b). In various embodiments, the gleaning request 530 is sent in response to an ID request 520 that the endpoint database 510 does not include the class ID for, while in other embodiments, the gleaning request 530 is sent periodically (e.g., every h hours, every d days, etc.).

Once the first endpoint database 510a has gleaned or otherwise learned the class ID for the second host device 140b, the first spine switch 120a sends a reply 540 to the first leaf node 130a that includes the class ID for the second host device 140b originally requested in the ID request. The first leaf switch 130a may cache the class ID of the second host device 140b locally for later use in communications between the host devices 140, and in determining whether to apply various security policies per methods 300 or 400, discussed in relation to FIGS. 3 and 4, respectively.

Figure 6:
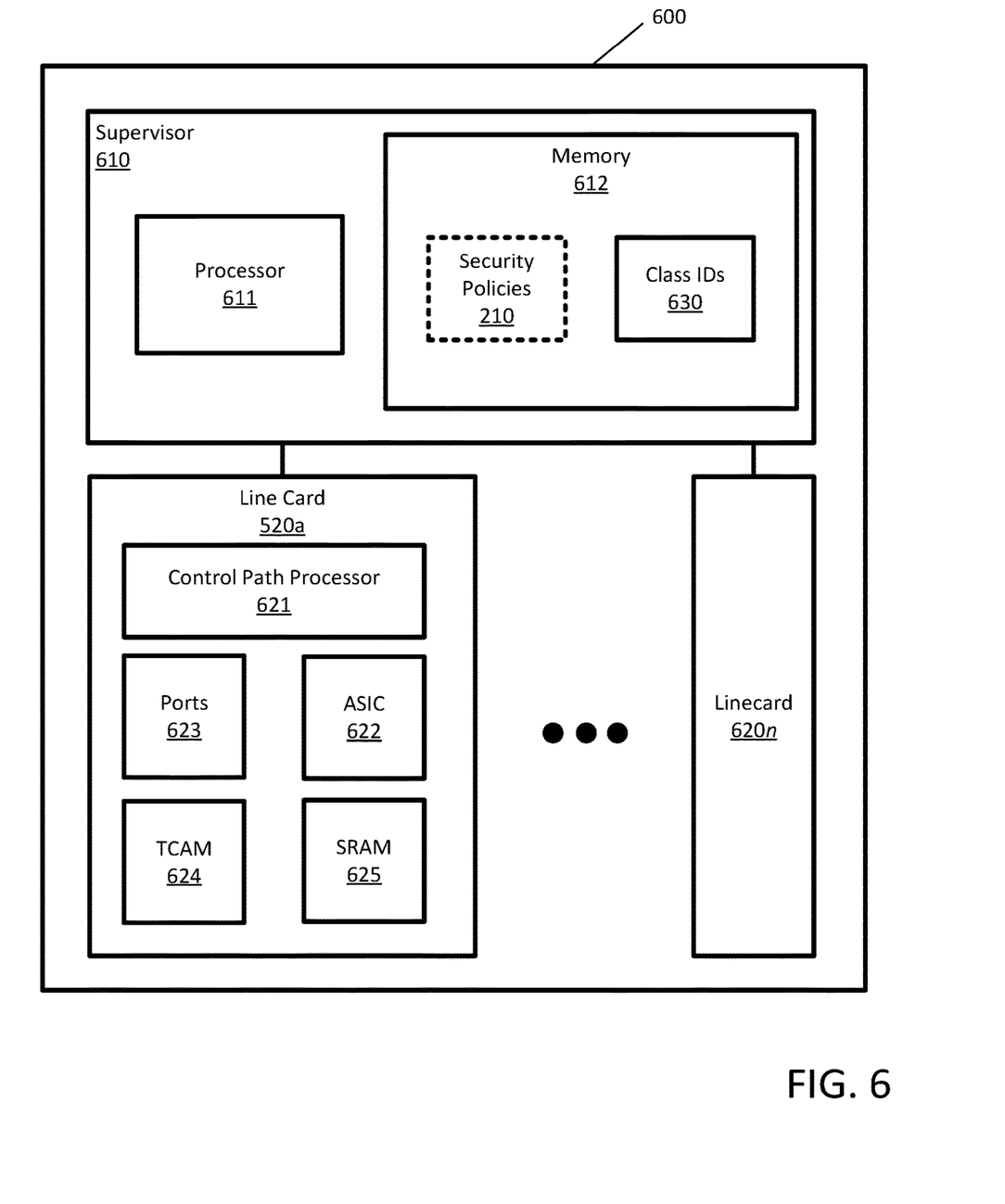
FIG. 6 illustrates hardware of a network switch, according to embodiments of the present disclosure.

FIG. 6 illustrates hardware of a network switch 600, as may be used as one of a spine switch 120 or a leaf switch 130 according to embodiments of the present disclosure. The network switch 600 includes a supervisor module 610 and a plurality of linecards 620a-n. The supervisor module 610 includes a processor 611 and memory 612. The memory 612 stores software instructions that are executed by the processor 611. In particular, the memory 612 may store various security policies 210, class IDs, and instructions for routing data to other devices (e.g., external devices or other network switches 600 in a network fabric) according to the present disclosure so as to localize the enforcement of security policies 210. When used as a leaf switch 130 associated with a service provider host, the network switch 600 may include a given set of security policies 210 associated with the service, and when used as a spine switch 120 or a leaf switch associated with a client host, the security policies 210 may be omitted. As will be appreciated, a network switch 600 may be connected to several hosts, and although omitting security policies 210 associated with one specific service, a given network switch 600 may include security policies 210 associated with a different service.

Each linecard 620 includes a control path processor 621, an Application Specific Integrated Circuit (ASIC) 622, a plurality of ports/interfaces 623 coupled to the ASIC 622, a Ternary Content-Addressable Memory (TCAM) 624, and a Static Random Access Memory (SRAM) 625. The control path processor 621 is a CPU/processor that receives configuration commands from the supervisor module 610 to program the TCAM 624 and SRAM 625. The ASIC 622 is a hardware device that directs an incoming packet at a port/interface 623 to a particular other port/interface on another device based on the content of the TCAM 624 and SRAM 625. The ASIC 622 may buffer received packets in the TCAM/SRAM for delayed transmission to the other device. There may be multiple TCAM/SRAM pairs in a linecard 620.

In the current disclosure, reference is made to various embodiments. However, the scope of the present disclosure is not limited to specific described embodiments. Instead, any combination of the described features and elements, whether related to different embodiments or not, is contemplated to implement and practice contemplated embodiments. Additionally, when elements of the embodiments are described in the form of "at least one of A and B," it will be understood that embodiments including element A exclusively, including element B exclusively, and including element A and B are each contemplated. Furthermore, although some embodiments disclosed herein may achieve advantages over other possible solutions or over the prior art, whether or not a particular advantage is achieved by a given embodiment is not limiting of the scope of the present disclosure. Thus, the aspects, features, embodiments and advantages disclosed herein are merely illustrative and are not considered elements or limitations of the appended claims except where explicitly recited in a claim(s). Likewise, reference to "the invention" shall not be construed as a generalization of any inventive subject matter disclosed herein and shall not be considered to be an element or limitation of the appended claims except where explicitly recited in a claim(s).

As will be appreciated by one skilled in the art, the embodiments disclosed herein may be embodied as a system, method or computer program product. Accordingly, embodiments may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, embodiments may take the form of a computer program product embodied in one or more computer readable medium(s) having computer readable program code embodied thereon.

Program code embodied on a computer readable medium may be transmitted using any appropriate medium, including but not limited to wireless, wireline, optical fiber cable, RF, etc., or any suitable combination of the foregoing.

Computer program code for carrying out operations for embodiments of the present disclosure may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present disclosure are described herein with reference to flowchart illustrations and/or block diagrams of methods, apparatuses (systems), and computer program products according to embodiments presented in this disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the block(s) of the flowchart illustrations and/or block diagrams.

These computer program instructions may also be stored in a computer readable medium that can direct a computer, other programmable data processing apparatus, or other device to function in a particular manner, such that the instructions stored in the computer readable medium produce an article of manufacture including instructions which implement the function/act specified in the block(s) of the flowchart illustrations and/or block diagrams.

The computer program instructions may also be loaded onto a computer, other programmable data processing apparatus, or other device to cause a series of operational steps to be performed on the computer, other programmable apparatus or other device to produce a computer implemented process such that the instructions which execute on the computer, other programmable data processing apparatus, or other device provide processes for implementing the functions/acts specified in the block(s) of the flowchart illustrations and/or block diagrams.

The flowchart illustrations and block diagrams in the Figures illustrate the architecture, functionality, and operation of possible implementations of systems, methods, and computer program products according to various embodiments. In this regard, each block in the flowchart illustrations or block diagrams may represent a module, segment, or portion of code, which comprises one or more executable instructions for implementing the specified logical function(s). It should also be noted that, in some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustrations, and combinations of blocks in the block diagrams and/or flowchart illustrations, can be implemented by special purpose hardware-based systems that perform the specified functions or acts, or combinations of special purpose hardware and computer instructions.

In view of the foregoing, the scope of the present disclosure is determined by the claims that follow.

We claim:

1. A method, comprising:
   receiving, at a local switch at a first site, a packet from a first host at the first site intended for a second host located at a second site at a different geographical location from the first site;
   identifying a second class identifier (ID) for the second host from a database maintained at the first site, wherein a first class ID for the first host is known to the local switch;
   determining, based on the first class ID and the second class ID, a security policy for transmitting data from the first host to the second host;
   in response to determining that the security policy indicates that the second site exclusively manages security policies for a software defined network including the first host and the second host:
   setting a policy applied indicator, derived from a policy override indicator, on the packet indicating that enforcement of the security policy is delegated from the local switch to a second switch connected to the second host at the second site;
   including the first class ID and the second class ID in the packet; and
   transmitting the packet to the second site.

2. The method of claim 1, further comprising:
   receiving, at the second switch at the second site, the packet from the first site; and
   in response to determining that the policy applied indicator indicates that the security policy was delegated from the local switch to the second switch:
   identifying the security policy based on the first class ID and the second class identifier; and
   applying the security policy to the packet, wherein applying the security policy results in the second switch delivering the packet to the second host.

3. The method of claim 2, wherein the second host is housed in a same subnet as a third host on the second site, wherein the third host is operated by a different tenant than the first host and the second host, wherein applying the security policy to the packet results in the second switch blocking the third host from receiving the packet.

4. The method of claim 1, further comprising:
   receiving, at the local switch, a second packet from the first host intended for a third host located at the second site, wherein a physical address of the second host is unknown to the first host and the local switch;
   identifying a third class ID for the third host from the database maintained at the first site;
   determining, based on the first class ID and the third class ID a second security policy for transmitting data from the first host to the third host;
   in response to determining that the security policy indicates that the first site exclusively manages security policies for a software defined network including the first host and the third host:
   determining, based on the second security policy to permit transmitting the second packet to the third host;
   including the first class ID and the second class ID in the packet; and
   transmitting the second packet to the second site.

5. The method of claim 1, wherein a physical address of the second host is unknown to the first host and the local switch, and the physical address being unknown includes:
   an IP (Internet Protocol) address assigned to the second host being unknown;
   a MAC (Media Access Control) address assigned to the second host being unknown; and
   a vLAN (Virtual Local Area Network) address assigned to the second host being unknown.

6. The method of claim 1, wherein the database maintained at the first site is maintained at a spine switch of the first site and is periodically updated with class IDs for hosts from the second site.

7. The method of claim 1, wherein the database maintained at the first site is a table maintained at the local switch that is populated with class IDs conversationally learned from communications received at the local switch.

8. A method, comprising:
   receiving, at a local switch of a first site, a packet from a remote host located at a second site, wherein the packet is intended for a local host located at the first site, wherein the packet includes a policy applied indicator; and in response to determining that the policy applied indicator indicates that a security policy for communication between the remote host and the local host is delegated to the local switch, applying the security policy to the packet at the local switch, wherein applying the security policy to the packet results in the local switch sending the packet to the local host.

9. The method of claim 8, further comprising:
receiving, at the local switch, a second packet from a second remote host located at the second site, wherein the second packet is intended for the local host, wherein the second packet includes a second policy applied indicator; and
in response to determining that the second policy applied indicator indicates that a second security policy for communication between the second remote host and the local host is not delegated to the local switch, forwarding the second packet to the local host.

10. The method of claim 8, wherein the packet further includes a first class ID for the remote host, and a second class ID for the local host, further comprising:
identifying the security policy to apply based on the first class ID and the second class ID.

11. The method of claim 10, further comprising:
learning the first class ID conversationally via received communications including the remote host.

12. The method of claim 10, wherein an address associated with the remote host is unknown to the local host, wherein the address includes:
an IP (Internet Protocol) address assigned to the remote host;
a MAC (Media Access Control) address assigned to the remote host; and
a vLAN (Virtual Local Area Network) address assigned to the remote host.

13. A network fabric, comprising:
a first site, including:
a first host; and
a first switch in communication with the first host;
a second site, located at a different geographic location than the first site, and in communication with the first site via an inter-site network, including:
a second host; and
a second switch in communication with the second host
wherein security policies for the network fabric are localized to the first site;
wherein the second switch is configured to:
in response to receiving a first packet from the second host addressed to the first host and determining that the security policies for the network fabric are localized to the first site, include a first class identifier (ID) of the first host, a second class ID of the second host, and a policy applied indicator in the first packet; and transmit the first packet to the first site; and
wherein the first switch is configured to:
in response to receiving the first packet, determine based on the policy applied indicator that the second switch delegates enforcement of the security policies to the first switch; and
apply a security policy to the first packet based on the first class ID and the second class ID.

14. The network fabric of claim 13, wherein applying the security policy causes the first switch to perform one action of the group consisting of:
blocking the first packet from the first host;
delivering the first packet to the first host; and
forwarding the first packet to a different device than the first host.

15. The network fabric of claim 13, wherein the first site further includes:
a third host, in communication with to the first switch;
wherein second switch is further configured to:
in response to receiving a second packet from the second host addressed to the third host and determining that the security policies for the network fabric are localized to the second site, apply a second security policy to the first packet based on the first class ID and the second class ID; and
transmit the second packet to the first site.

16. The network fabric of claim 13, further comprising a database maintained at the first site that is periodically updated with class IDs for hosts maintained at the second site.

17. The network fabric of claim 16, wherein the class IDs maintained in the database are conversationally learned from communications received at the first switch.

18. The network fabric of claim 17, wherein a physical address of the second host is unknown to the first host and the first switch, and the physical address being unknown includes:
an IP (Internet Protocol) address assigned to the second host being unknown;
a MAC (Media Access Control) address assigned to the second host being unknown; and
a vLAN (Virtual Local Area Network) address assigned to the second host being unknown.

19. The network fabric of claim 17, wherein the class IDs identify tenant-defined types of devices or services provided in the network fabric.

20. The network fabric of claim 19, wherein the first switch identifies which security policy to apply to the packet based on a first class ID associated with the first host and a second class ID associated with the second host.

* * * * *

UNITED STATES PATENT AND TRADEMARK OFFICE
CERTIFICATE OF CORRECTION

PATENT NO. : 11,184,325 B2
APPLICATION NO. : 16/431615
DATED : November 23, 2021
INVENTOR(S) : Murukanandam K. Panchalingam et al.

Page 1 of 1

It is certified that error appears in the above-identified patent and that said Letters Patent is hereby corrected as shown below:

On the Title Page

Item (56), in Column 2, under "Other Publications", Line 1, delete "Intematinoal" and insert -- International --, therefor.

Item (57), in Column 2, in "Abstract", Line 2, delete "multi-site" and insert -- multi site --, therefor.

Item (57), in Column 2, in "Abstract", Line 10, delete "hosts'" and insert -- host's --, therefor.

On the page 2, item (56), in Column 2, under "Other Publications", Line 1, delete "Notificiation" and insert -- Notification --, therefor.

In the Drawings

On sheet 6 of 6, in Figure 6, reference numeral 520a, Line 1, delete "Line Card" and insert -- Linecard --, therefor.

In the Specification

In Column 2, Line 9, delete "multi-site" and insert -- multi site --, therefor.

In Column 2, Line 30, delete "multi-site" and insert -- multi site --, therefor.

In Column 6, Line 43, delete "VLAN" and insert -- vLAN --, therefor.

In the Claims

In Column 14, Line 19, in Claim 15, delete "with to the" and insert -- with the --, therefor.

Signed and Sealed this
Twenty-second Day of February, 2022

Drew Hirshfeld
*Performing the Functions and Duties of the*
*Under Secretary of Commerce for Intellectual Property and*
*Director of the United States Patent and Trademark Office*